(12) United States Patent
Fabritius

(10) Patent No.: US 7,588,791 B2
(45) Date of Patent: Sep. 15, 2009

(54) MIXTURES OF TRIGLYCERIDES OF NATURAL POLYUNSATURATED FATTY ACIDS WITH HIGH POLYUNSATURATED FATTY ACID CONTENT, METHOD FOR PRODUCING SAME AND USE THEREOF

(75) Inventor: Dirk Fabritius, Mainz (DE)

(73) Assignee: Nutrinova Nutrition Specialties & Food Ingredients GmbH, Frankfurt (DE)

( * ) Notice: Subject to any disclaimer, the term of this patent is extended or adjusted under 35 U.S.C. 154(b) by 383 days.

(21) Appl. No.: 10/493,116

(22) PCT Filed: Oct. 16, 2002

(86) PCT No.: PCT/EP02/11534

§ 371 (c)(1),
(2), (4) Date: May 5, 2004

(87) PCT Pub. No.: WO03/033631

PCT Pub. Date: Apr. 24, 2003

(65) Prior Publication Data

US 2005/0129831 A1    Jun. 16, 2005

(30) Foreign Application Priority Data

Oct. 19, 2001    (DE)    ............... 101 51 155

(51) Int. Cl.
*A23D 9/00*    (2006.01)

(52) U.S. Cl. .............. 426/601; 426/422; 426/424; 426/478; 426/495

(58) Field of Classification Search ............ 426/601, 426/422, 424, 478, 495
See application file for complete search history.

(56) References Cited

U.S. PATENT DOCUMENTS

| 2,684,378 | A | * | 7/1954 | Skau | 554/207 |
| 3,541,123 | A | * | 11/1970 | Matsui et. al. | 554/185 |
| 3,944,585 | A | * | 3/1976 | Luddy et al. | 554/208 |
| 4,205,006 | A | * | 5/1980 | Luddy et al. | 554/223 |
| 4,675,132 | A | * | 6/1987 | Stout et al. | 554/174 |
| 5,189,189 | A | * | 2/1993 | Misawa et al. | 554/194 |
| 6,020,020 | A | | 2/2000 | Cain et al. | |
| 6,117,905 | A | * | 9/2000 | Higashiyama et al. | 514/560 |
| 6,344,574 | B1 | * | 2/2002 | Foglia et al. | 554/20 |
| 6,395,778 | B1 | * | 5/2002 | Luthria | 514/549 |
| 6,870,077 | B2 | * | 3/2005 | Kenaschuk | 800/298 |
| 2004/0059142 | A1 | * | 3/2004 | Bijl et al. | 554/175 |

FOREIGN PATENT DOCUMENTS

| EP | 1 215 274 A1 | 6/2002 |
| JP | 59059644 A | 5/1984 |
| NL | 1215274 | * 12/2000 |
| WO | WO 93/25645 | 12/1993 |
| WO | WO 00/50547 | 8/2000 |

OTHER PUBLICATIONS

Chen, T-C., and Ju, Y-H., "Polyunsaturated Fatty Acid Concentrates from Borage and Linseed Oil Fatty Acids", Journal of the American Oil Chemists' Society, 78(5):485-488 (2001).

* cited by examiner

*Primary Examiner*—Carolyn A Paden
(74) *Attorney, Agent, or Firm*—Hamilton, Brook, Smith & Reynolds, P.C.

(57) ABSTRACT

A process for increasing the concentration of PUFA triglycerides present in natural PUFA oils, in which a natural PUFA oil having a triglyceride content of more than 85% by weight, based on the total weight of the mixture, and having a total PUFA content of more than 39% by weight of total fatty acids is dissolved in an organic solvent or an organic solvent mixture, the mixture is allowed to stand at a temperature of from −35° C. to −100° C. for a period of more than five minutes, the mixture is separated into a supernatant comprising PUFA-triglyceride mixture and a sediment phase, the separation preferably taking place by filtration or centrifugation, and the solvent or solvent mixture, after the removal of the sediment phase, is separated from the supernatant. PUFA-triglyceride mixtures having a PUFA content of more than 55% by weight of total fatty acids of a main PUFA, or at least two PUFAs selected from stearidonic acid, eicosapentaenoic acid, docosapentaenoic acid, docosahexaenoic acid, gamma-linolenic acid and arachidonic acid, and also use thereof in pharmaceutical, cosmetics and food preparations.

14 Claims, No Drawings

MIXTURES OF TRIGLYCERIDES OF NATURAL POLYUNSATURATED FATTY ACIDS WITH HIGH POLYUNSATURATED FATTY ACID CONTENT, METHOD FOR PRODUCING SAME AND USE THEREOF

RELATED APPLICATIONS

This application is the U.S. National Stage of International Application No. PCT/EP02/11534, filed Oct. 16, 2002, and published in German, which claims the benefit of German Application No. 101 51 155.8, filed Oct. 19, 2001.

BACKGROUND OF THE INVENTION

The present invention relates to a method for producing natural PUFA-enriched PUFA-triglyceride mixtures (PUFAs=Polyunsaturated Fatty Acids) having a minimum PUFA content of >55% by weight of TFA (Total Fatty Acids), the great majority of these consisting of triglycerides. These are obtained by winterization in one or more organic solvents from natural PUFA oils having a PUFA content >39% by weight of TFA.

Polyunsaturated fatty acids are essential fatty acids for the human organism. PUFAs can be subdivided into two large groups. In addition to the group of the ω-6 PUFAs, which are formulated starting from linoleic acid (18:2), there is the group of the ω-3 PUFAs, which are made up starting from α-linolenic acid (18:3.). PUFAs are important building blocks of cell membranes, the retina and the meninges, and are precursors for important hormones, for example prostaglandins, thromboxanes and leukotrienes.

Examples of nutritionally important PUFAs are shown in table 1:

TABLE 1

| Name | Chain length and number of C-C double bonds | Most important sources |
|---|---|---|
| Omega-3 fatty acids | | |
| α-Linolenic acid (ALA) | C 18:3 | linseed oil, soybean oil, rapeseed oil |
| Stearidonic acid (SA) | C 18:4 | microbially produced oils |
| Eicosapentaenoic acid (EPA) | C 20:5 | saltwater fish (mackerel, salmon, herring, sardine, tuna) |
| Docosapentaenoic acid (DPA) | C 22:5 | saltwater fish (mackerel, salmon, herring), microbially produced oils |
| Docosahexaenoic acid (DHA) | C 22:6 | saltwater fish, microbially produced oils (protists) |
| Omega-6 fatty acids | | |
| γ-Linolenic acid (GLA) | C 18:3 | evening primrose oil, borage oil, blackcurrants |
| Arachidonic acid (ARA) | C 20:4 | saltwater fish, microbially produced oils (*Mortierella*) |

In addition to their function as building blocks, in recent years it has been found-that PUFAs directly have many beneficial effects on the human organism, or disorders.

A multiplicity of clinical studies have found that PUFAs, in the case of, for example, cancer, rheumatoid arthritis, high blood pressure and neurodermatitis and many other disorders, can make an important contribution to healing or relief. These results were originally responsible for international institutions and authorities making recommendations which control the daily intake of PUFAs.

PUFAs cannot be synthesized de novo by humans, since they lack the enzyme systems which could introduce a C—C double bond into the carbon chain at positions >C9 (lack of Δ12-desaturase). Not until precursor fatty acids (for example α-linolenic acid) are supplied via the diet are humans able to synthesize polyunsaturated fatty acids. However, whether this amount is sufficient to cover the requirement of polyunsaturated fatty acids is controversial.

The majority of the essential fatty acids is consumed via the diet. Plant oils in particular are enriched, with ω-6 fatty acids (for example blackcurrant contains GLA, that is to say gamma-linolenic acid), but these fatty acids are present here only in a chain length up to C18.

Fish oils contain ω-3 fatty acids (for example salmon oil contains EPA at up to 18% by weight of TFA, and DHA at 12% by weight of TFA). However, generally, the content of the desired PUFA is low and it is present in a mixture, in which case PUFAs having an antagonistic action can likewise be present. In particular in infant nutrition, EPA, owing to its bleeding-inhibition and growth-inhibition properties is undesirable (M. Hamosh (1998). *Long-chain polyunsaturated fatty acids: who needs them? Biochem. Soc. Trans.*, 26(2), 96-103). There are natural limits to highly concentrated PUFA triglycerides from fish oils, on account of the triglyceride composition. The typical total content of EPA and DHA from fish oils is approximately 10-25% by weight of TFA. Owing to the multiplicity of different fatty acids and thus also varied triglyceride species, the maximum achievable PUFA concentrations are at most 30% by weight of TFA.

By using biocatalytic methods (employing lipases) it is possible to increase the. PUFA concentration in triglycerides to the range around DHA 40% by weight of TFA (Marinol D40® from Loders & Crocklaan, Wormerveer, Netherlands). However, natural oils cannot be produced in this manner.

A similar approach is the retrosynthesis of PUFA triglycerides or structural lipids. Here, by means of a lipase (specific or non-specific), high-purity PUFA triglycerides or structural lipids are produced starting from pure PUFAs (G. G. Haraldsson, B. Ö. Gudmundsson and Ö. Almarsson (1995): *The synthesis of homogenous triglycerides of eicosapentaenoic acid and docosahexaenoic acid by lipase. Tetrahedron*, 51(3), 941-952, R. Irimescu, K. Hata, Y. Iwasaki and T. Yamane (2001): *Comparison of acyl donors for lipase-catalyzed production of 1,3-Dicapryloyl-2-eicosapentaenoylglycerol*. JAOCS, 78(1), 65-67, F.-C. Huang, Y.-H. Ju and J.-C. Chiang (1999): *γ-Linolenic acid-rich triacylglycerols derived from borrage oil via lipase-catalyzed reactions*. JAOCS, 76(7), 833-837). The high cost of pure PUFAs, however, does not make this process appear very expedient. In these cases, also, natural oils are no longer present.

Producing relatively highly enriched PUFA concentrates (EPA+DHA>30% by weight. of TFA) in the form of natural triglycerides is therefore currently a challenge which has not been met (Haraldsson, G., G. (2000): *Enrichement of Lipids with EPA and DHA by lipase. In Enzymes in Lipid Modification. Ed. U. Bornscheuer, Wiley VCH*).

Producing relatively highly concentrated PUFA-triglyceride mixtures from marine oils is also difficult (S.-B. Park, Y. Endo, K. Maruyama and K. Fujimoto (2000): *Enzymatic synthesis of ethyl ester of highly unsaturated fatty acids from fish oils using immobilized lipase. Food Sci. Technol.*, 6(3), 192-195). By means of complex chromatographic methods or short-path distillation, triglyceride fractions which are highly enriched with PUFAs may theoretically be isolated, but many problems occur (W. M. Willis, R. W. Lencki and A. G. Marangoni (1998): *Lipid modification strategies in the production of nutritionally functional fats and oils. Crit. Rev. Food Sci.*, 38(8), 639-674, Hayashi, K. and H. Kishimira (1996): *Preparation and purification of DHA-enriched triacylglycerols from fish oils by column chromatography. Fisheries Science*, 62(5), 842-843). These methods are expensive and complex. Furthermore, a thermal load of the PUFAs which are labile to oxidation is undesirable and leads to product decomposition. Generally, these methods therefore lead to oils which are no longer natural.

Therefore, to produce PUFA concentrates, it is not natural oils which are used, but rather fatty acid or ester mixtures which are enriched, for example, by urea precipitation (S. P. J. N. Senanyake and F. Shahidi (2000): *Concentration of docosahexaenoic acid (DHA) from algael oil via urea complexation. J. of Food Lipids*, 7, 51-61, W. M. N. Ratnayake, B. Olsson, D. Matthews and R. G. Ackmann (1988): *Preparation of omega-3 PUFA concentrates from fish oil via urea complexation. Fat. Sci. Technol.*, 10, 381-386). In these cases, very pure PUFA concentrates may likewise be produced. However, precipitation with urea is not suitable for triglycerides. Furthermore, the FDA has reported a physiologically hazardous formation of carbamate (carcinogenic class of substances) in the precipitation with urea (B. J. Canas (1999): *Ethyl carbamate formation during urea complexation, for fractionation of fatty acids. JAOCS*, 76(4), 537).

Other authors report small increases in PUFA concentration and poor yields according to processes such as dry fractionation (without solvent) or solvent crystallization (specifically with acetone). Bimbo and Crowther achieved an increase in DHA concentration from 10% by weight of TFA to 11% by weight of TFA and Lee et al. were able to achieve an increase in DHA/EPA concentration from 30.4% by weight of TFA to 35.3% by weight of TFA (A. P. Bimbo and J. B. Crowther (1991): *Fish oils: processing beyond crude oil. Infofish International*, 6, 20-25, K.-T. Lee and T. A. Foglia (2001): *Fractionation of menhaden oil and partially hydrogenated menhaden oil: characterization of triacylglycerol fractions. JAOCS*, 78(3), 297-303).

With a nominal amount of one DHA or EPA molecule per triglyceride, increasing the PUFA concentration without using enzymatic methods or resynthesis is not practicable above a concentration of 300 mg/g of oil. Achieving an EPA or DHA concentration of 300 mg/g of oil is not simple (Ackmann, R. A. (1988): *The year of the fish oils. Chemistry and Industry*, 7, 139-145). Higher contents are generally only offered in the form of the ethyl or methyl esters, although here also contents of a main PUFA of greater than 32.6% by weight of TFA are not achievable (Moffat, C. F., A. S. McGill, R. Hardy and R. A. Anderson (1993): *The production of fish oils enriched in polyunsaturated fatty acid-containing triglycerides. JAOCS*, 70(2), 133-138). Here, a complex method is used, in the form of freezing with liquid nitrogen and subsequent extraction at −60° C. The method is seen by the authors as a method for separating off solid triglycerides, rather than a method for producing highly enriched PUFA triglycerides. Liquid nitrogen is a dangerous substance which cannot be used simply, in particular industrially.

Only by using microorganisms is it possible to produce natural PUFA oils which have higher concentrations of PUFAs than fish oils or plant oils (K. D. Mukherjee (1999): *Production and use of microbial oils. Inform*, 10(4), 308-313). For instance, these oils can contain DHA at up to 40% by weight of TFA, GLA at 30% by weight of TFA, or ARA at 40% by weight of TFA.

For use in the food sector, in the clinical sector and in infant nutrition, the administration of natural triglycerides highly enriched with PUFAs is desirable, since it has been found that the intake of PUFAs in the form of triglycerides is particularly preferred (G. G. Haraldsson and A. Thorerensen (1999): *Preparation of phospholipids highly enriched with n-3 polyunsaturated fatty acids by lipase. JAOCS*, 76(10), 1143-1149, K. Osada, K. Takahashi and M. Hatano (1990): *Hydrolysis and synthesis of icosapentaenoic acid-docosahexaenoic acid rich oil by lipase toyo. J. Jpn. Oil Chem. Soc.*, 1, 50-52). The use of free fatty acids in nutrition is unsuitable, in contrast,. In particular this relates to infant nutrition, since PUFAs likewise occur in human milk in the form of natural triglyceride mixtures (A. R. Medina, L. E. Cerdan, A. G. Gimenez, B. C. Paez, M. J. I. Gonzalez and E. M. Grima (1999): *Lipase-catalyzed esterification of glycerol and polyunsaturated fatty acids from fish and microalgae oils. J. of Biotechnology*, 70, 379-391).

Furthermore, the amount of PUFAs to be consumed daily is a problem, since high oil quantities (for example fish oils) need to be consumed. In particular, this relates to those patients who need to consume high concentrations of PUFAs (for example in the case of cystic fibrosis), since when high amounts of fish oil are consumed, side effects can occur (Y. Kosugi and A. Azuma (1994): *Synthesis of triacylglycerols from polyunsaturated fatty acid by immobilized lipase, JAOCS*, 71(12), 1397-1403). To achieve as specific an action as possible of the individual PUFAs, enriched or high-purity PUFAs must be used. There is therefore in the prior art a great requirement for natural triglycerides which are highly enriched with PUFAs (Haraldsson, G., G. (2000): *Enrichement of Lipids with EPA and DHA by lipase. In Enzymes in Lipid Modification*, Ed. U. Bornscheuer, Wiley VCH).

Winterization which has long been known is a method by which oils are separated off from solid fractions (waxes, fatty alcohols, saturated triglycerides) (from Wolf Hamm and Richard J. Hamilton (2000): *Edible oil processing, Chapter 4, Sheffield Academic Press*), or of producing oils having defined melting points (S. Hashimoto, T. Nezu, H. Arakawa, T. Ito and S. Maruzeni (2001): *Preparation of sharp-melting hard palm midfraction and its use as hard butter in chocolate. JAOCS*, 78(5), 455-460). In practice, this is the method of choice for producing oils from fats.

Yokochi et al. (1990) JAOCS, 67(11), 846-851, describe winterization for increasing the GLA concentration starting from an oil which was produced by fermentation with *Mortierella ramanniana*. However, Yokochi et al. do not achieve by far the PUFA concentrations which can be achieved using the present invention. GLA concentrations of only 10.5% by weight of TFA (GLA starting concentration 5.7% by weight of TFA) were achieved. In this method some solvents which are not permitted by food regulations were used (petroleum ether).

Linseed oil contains α-linolenic acid (18:3) at up to 62% by weight of TFA. No other natural composition is known in which another PUFA, in particular DHA and/or EPA, is present in such a high concentration in the form of triglycerides. In particular, however, other PUFAs such as DHA and/or EPA are also particularly beneficial to health. These PUFAs have more than 3 C—C double bonds.

Therefore, in the prior art, there is still a very great requirement for those compositions which contain natural PUFA triglycerides in high concentrations. There is a particularly great requirement for the following PUFAs: stearidonic acid (SA), eicosapentaenoic acid (EPA), docosapentaenoic acid (DPA), docosahexaenoic acid (DHA), γ-linolenic acid (GLA) and arachidonic acid (ARA). There is a very particularly high requirement for eicosapentaenoic acid (EPA), docosahexaenoic acid (DHA) and γ-linolenic acid (GLA).

SUMMARY OF THE INVENTION

In view of said prior art, it was therefore an object of the present invention to provide a method for producing natural highly concentrated PUFA-triglyceride mixtures from PUFA oils of lower concentration, where composition (PUFA-triglyceride mixtures) containing stearidonic acid (SA), eicosapentaenoic acid (EPA), docosapentaenoic acid (DPA), docosahexaenoic acid (DHA), γ-linolenic acid (GLA) and also arachlidonic acid (ARA) are preferably produced. Particularly preferably, by means of the inventive method, compositions having an elevated content of eicosapentaenoic acid (EPA), docoshexaenoic acid (DHA) and γ-linolenic acid (GLA) are to be able to be produced.

In particular, the compositions (PUFA-triglyceride mixtures) to be provided are also precisely those which are enriched in PUFAs having 4 or more C—C double bonds.

DETAILED DESCRIPTION OF THE INVENTION

The natural character of the triglycerides is to be retained in this case. The total PUFA content which can be achieved is to be >55% by weight of TFA in each case. Preferably, the resultant triglyceride mixtures here are to be particularly suitable for use in the food sector or in pharmacology. Therefore, preferably, only those solvents are to be used which are explicitly mentioned, and are permitted for the food sector, in the directive (88/344/EEC) of the Council of the European Union of Jun. 13, 1998. Other solvents, however, may also be suitable for achieving this object.

These objects, and also other objects which are not explicitly mentioned but which can be derived or inferred without problem from the connections discussed herein at the outset, are achieved by a method as claimed herein. Expedient modifications of the inventive method are also claimed.

By means of the fact that
(i) a PUFA oil having a triglyceride content of >85% by weight and having a PUFA content of >39% by weight of TFA is dissolved in an organic solvent or a mixture of solvents,
(ii) the mixture is allowed to stand at a defined temperature for a defined time,
(iii) the mixture is separated into a supernatant (main product) containing the concentrated PUFA-triglyceride mixtures and a sediment phase (by-product), and
(iv) the solvent is removed again from the main product which contains the highly concentrated PUFA triglycerides,
the inventive object can actually be achieved astonishingly simply.

For the, purposes of the present invention, "natural triglyceride mixtures" always means the product of the inventive method. The starting materials used in the method are always natural PUFA oils.

For the purposes of the present invention, a PUFA oil is taken to mean: compositions having a triglyceride content of at least 85% by weight, preferably at least 90% by weight, particularly preferably at least 95% by weight, based on the total weight of the composition (of the PUFA oil) and having a total PUFA content >39% by weight, based on the total fatty acids (TFA). The term oil, according to the invention, is also to comprise those mixtures which, because of their consistency, are not usually assigned to the oils, for example waxes and fats. These PUFA oils can originate, for example, from microorganisms, or can be fish oils and plant oils, for example DHA oils from *Crypthecodinium, Schizochytrium, Thraustochytrium, Ulkenia* and ARA-containing oils from *Mortierella* and *Porphyridium*, EPA-containing oils from *Chlorella*, GLA oils from genetically modified rapeseed, and also other corresponding compositions. Particularly preferably, microbial oils produced according to the invention are used. Likewise highly suitable are oils from genetically modified plants. In addition, fish oils and vegetable oils have proved to be suitable.

Therefore it is clear that PUFA oils, according to the invention, can also contain, in addition to triglycerides, for example small amounts of diglycerides or free fatty acids, and also originate from natural sources, in some circumstances genetically modified sources, so that it must always be assumed that a small amount of impurities is present. PUFA oils which are not considered to be natural for the purposes of the present invention are those PUFA oils where the triglycerides have been produced, for example, by resynthesis using lipases.

Therefore, for the purposes of the present invention, natural means not produced by chemical or biocatalytic modification.

In contrast to the abovementioned methods, by means of the inventive method, a total PUFA content of >55% by weight of TFA is always achieved. By means of, this process, likewise, previously unattainable total PUFA contents >60% by weight of TFA, preferably >70% by weight of TFA, particularly preferably >80% by weight of TFA, and very particularly preferably >90% by weight of TFA may be achieved. The products always arise according to the invention as natural triglyceride mixtures and not as free fatty acids or other esters. These natural triglyceride mixtures are therefore preferred embodiments of the present invention.

Particular preference is given to relatively highly concentrated mixtures. Total PUFA content, for the purposes of the present invention, means the sum of the concentrations of at least two PUFAs which are selected from the following group: stearidonic acid (SA), eicosapentaenoic acid (EPA), docosapentaenoic acid (DPA), docosahexaenoic acid (DHA), γ-linolenic acid (GLA) and also arachidonic acid (ARA); particularly preferably, eicosapentaenoic acid (EPA), docosahexaenoic acid (DHA) and γ-linolenic acid (GLA) are to be present in the mixture.

In the composition, therefore, other PUFAs which have not been explicitly mentioned can also be present. These other PUFAs, however, are not taken into account in the calculation of the total PUFA content.

This total PUFA content defined according to the invention is therefore also termed the target PUFA content.

Further preferred exemplary embodiments of the present invention are, in addition, those natural triglyceride mixtures which have a content of a main PUFA of >50% by weight of TFA, preferably >60% by weight of TFA, particularly preferably >70% by weight of TFA, very particularly preferably >80% by. weight of TFA, and most preferably >90% by weight of TFA, this main PUFA being selected from the group consisting of: stearidonic acid (SA), eicosapentaenoic acid (EPA), docosapentaenoic acid (DPA), docosahexaenoic acid (DHA), γ-linolenic acid (GLA) and also arachidonic acid (ARA); particular preference is given here to eicosapentaenoic acid (EPA), docosahexaenoic acid (DHA) and γ-linolenic acid (GLA).

According to the invention, preferably, those solvents are to be used which are mentioned explicitly in directive (88/344/EEC) of the Council of the European Union of Jun. 13, 1998 and which are permitted for the food sector, that is to say propane, butane, butyl acetate, ethyl acetate, ethanol, carbon dioxide, acetone and dinitrogen monoxide, hexane, methyl acetate, ethyl methyl ketone and also dichloromethane. Other solvents are unsuitable for the present invention because of health concerns if the resultant natural PUFA-triglyceride-enriched triglyceride mixture is to be used in the food sector.

Solvents which are suitable according to the invention are preferably those selected from the group consisting of: ethanol, n-hexane, acetone, isopropanol, methanol. Particularly preferred from these are n-hexane, ethanol and acetone. Very particular preference is also given to mixtures of these solvents. It has been found that the mixture n-hexane/ethanol, where the ratio of the percentages by volume of the two solvents, based on the mixture, with the condition that the sum of the percentages by volume always attains the value 100, can range from 20:80 to 30:70, is very highly suitable according to the invention. Still more suitable is n-hexane/acetone where the ratio of the percentages by volume of the two solvents, based on the mixture, with the condition that the sum of the percentages by volume always attains the value 100, can range from 5:95 to 20:80. The best results were achieved with n-hexane/ethanol where the ratio of the percentages by volume of the two solvents, based on the mixture, with the condition that the sum of the percentages by volume always attains the value 100, can range from 5:95 to 20:80, so that such solvent mixtures are very particularly preferably used in the present invention. Most preferably, n-hexane/acetone (10:90; v:v) is used.

Other solvents can also be used according to the invention, however, if the prescriptions of the food sector do not need to be taken into account, for instance in the case of cosmetic or pharmacological applications. In this case, preferably, solvents such as ACN or petroleum ether, inter alia, can also be used.

The temperature of stage (ii) of the above method can vary greatly depending on the initial mixture used. The temperature range from −35° C. to −100° C. has proved to be particularly suitable. More expedient is the range from −50° C. to −100° C. In general, in particular very low temperatures are expedient, the range from −85° C. to −100° C. being particularly expedient. Obviously, still lower temperatures can also be used, but these are usually uneconomic because of the increased energy costs.

Stage (ii) is carried out according to the invention for at least 5 minutes and can be carried out for up to 18 hours. Particularly preferably, stage (ii) is carried out for from 5 to 120 min, still more preferably for from 10 min to 100 min, and very particularly preferably for 30 min-60 min.

For the separation of main product and by-product from stage (iii), centrifugation, filtration and dry-ice filtration can be used.

To separate off the solid fat fraction from the liquid oil, all customary separation methods can be used which utilize the differing densities of the phases to be separated. For instance, in addition to centrifugation, the separation or else the decanter can be used. The centrifugation is preferably carried out at 3 000-4 000 g. Values of 1 000-2 000 g are likewise suitable.

In the filtration, customary filtration methods, for example paper filters, membrane filters and membrane filter presses with and without pressure can be used.

Particularly preferably, the filtration is carried out through a blue ribbon filter without vacuum. To ensure adequate cooling, the filter is designed with dry ice and solid carbon dioxide is likewise added to the material to be filtered. This ensured cooling to −65° C.

In all cases it is necessary to ensure adequate cooling (depending on the oil).

To remove the solvents, any customary method for separating off solvents in vacuo is suitable, for example the use of rotary evaporators, distillation systems or methods without vacuum, for example blowing off the solvents with inert gases.

From a further aspect of the present invention, PUFAs preferred according to the invention always contain at least 4 C—C double bonds, preferably at least 5, particularly preferably at least 6 C—C double bonds.

Preferred exemplary embodiments of the present invention further comprise the use of the inventive natural triglyceride mixtures having a total PUFA content of >55% by weight of TFA, preferably >60% by weight of TFA, particularly preferably >70% by weight of TFA, very particularly preferably >80% by weight of TFA, and most preferably >90% by weight of TFA, or of mixtures containing these natural triglyceride mixtures or their secondary products or of compositions containing, 55% by weight of TFA, preferably >60% by weight of TFA, particularly preferably >70% by weight of TFA, very particularly >80% by weight of TFA, and most preferably >90% by weight of TFA, of a main PUFA, the PUFAs always being selected from. the group consisting of: stearidonic acid (SA), eicosapentaenoic acid (EPA), docosapentaenoic acid (DPA), docosahexaenoic acid (DHA), γ-linolenic acid (GLA) and also arachidonic acid (ARA), particularly preferably eicosapentaenoic acid (EPA), docosahexaenoic acid (DHA) and γ-linolenic acid (GLA), as active compound or constituent in pharmaceutical preparations, or as constituent of functional foods, or as constituent of cosmetic preparations, or as food additive, for example for bakery products.

List of abbreviations:
ALA alpha-linolenic acid
ARA arachidonic acid
DHA docosahexaenoic acid
DPA docosapentaenoic acid
EPA eicosapentaenoic acid
GLA gamma-linolenic acid
PUFA polyunsaturated fatty acid
SA stearidonic acid
TFA total fatty acids
w/w part by weight/part by weight
v/v part by volume/part by volume
% by weight of TFA percentage by weight based on total fatty acids The examples below describe the invention in more detail.

EXAMPLE 1

Production of a Natural Triglyceride Mixture Having a DHA Content (Main PUFA Content) of >55% by Weight of TFA and a Total PUFA Content of 58% by Weight of TFA Commercially available DHASCO® from Martek Biosciences Corporation® (Columbia, Md., USA) was used. The DHA content of the initial mixture is 45.1% by weight of TFA (manufacturer specification 42.8% by weight of TFA).

1.0 g of oil is dissolved in 40 ml of n-hexane/ethanol (20:80; v:v) (approximately 2.9% by weight) and frozen for 8 h at −85° C. The mixture is then centrifuged. at 0° C. for 2 minutes at 3 600 rpm and the supernatant is 35 taken off using a Pasteur pipette. After removing the solvents on a rotary evaporator, 377.1 mg of a clear yellow oil are obtained. In addition, a clear yellow oil is produced as residue (632.7 mg).

GC analysis gave, for the product fraction, a DHA content of 57.5% and, for the residue, a DHA content of 38.2%. The DHA concentration factor is 1.3.

The oils are analyzed after transesterification by generally known methods to form the methyl esters and subsequent gas-chromatographic analysis (Hewlett-Packard GC6890, column: Macherey & Nagel FFAP Permabond 0.1 μm (25 m, 0.25 mm), split mode (10:1), carrier gas: helium (constant flow 1.0 ml/min), FID operation with hydrogen (30 ml/min) and oxygen (300 ml/min) as combustion gases, make up: 20 ml of helium, detector and injector temperature: in each case 255° C., GC oven temperature program: initial temperature 160° C., holding phase 12 minutes isothermal, temperature rise rate 10° C./min to a final temperature of 230° C., hold this for 5 min, injection volume: 1.0 μl). By adding an internal standard to the reaction batch, quantitative analysis can be carried out.

EXAMPLE 2

Production of a Natural Triglyceride Mixture Having a DHA Content (Main PUFA Content) of >60% by Weight of TFA and a Total PUFA Content of 79.5% by Weight of TFA An oil produced as described in Yokochi et al., Appl. Microb. Biotechnol., (1998) 49, pp. 72-76 was used. The culture was carried out using glycerol as carbon source. The DHA content of the initial mixture was 47.0% by weight of TFA. The DPA content was 13.4% by weight of TFA.

1.0 g of oil is dissolved in 40 ml of n-hexane/acetone (10:90; v:v) (approximately 2.8% by weight) and frozen for 3 h at −85° C. The mixture is then centrifuged at 0° C. for 2 minutes at 3 600 rpm and the supernatant is taken off using a Pasteur pipette. After removing the solvents, 537.3 mg of a clear yellow oil are obtained.

In addition, a turbid yellow oil is produced as residue (472.0 mg). GC analysis gave, for the product fraction, a DHA content of 64.0% by weight of TFA and, for the residue, a DHA content of 34.3% by weight of TFA. The DPA content in the product fraction was 15.5% by weight of TFA. The DHA concentration factor is 1.3.

EXAMPLE 3

Production of a Natural Triglyceride Mixture Having a DHA Content (Main PUFA Content) of >700% by Weight of TFA and a Total PUFA Content of 85.3% by Weight of TFA An oil produced as described in Yokochi et al., Appl. Microb. Biotechnol., (1998) 49, pp. 72-76 was used. The culture was carried out using glycerol as carbon source. The DHA content of the initial mixture is 46.4% of the total fatty acids. The DPA content was 11.3% by weight of TFA.

3.8 g of oil are dissolved in 100 ml of n-hexane/ethanol (10:90; v:v) (approximately 3.8% by weight) and frozen for 8 h at −85° C. The mixture is then centrifuged at 0° C. for 2 minutes at 3 600 rpm and the supernatant is taken off using a Pasteur pipette. After removing the solvents, 174.9 mg of a clear yellow oil are obtained. In addition, a turbid yellow oil is produced as residue (3.62 g). GC analysis gave, for the product fraction, a DHA content of 70.1% by weight of TFA and, for the residue, a DHA content of 44.4% by weight of TFA. The DPA content in the product fraction was 15.2% by weight of TFA. The purification factor for DHA is 1.5.

EXAMPLE 4

Effect of the Solvents on the Product Concentration

An oil produced as described in Yokochi et al., Appl. Microb. Biotechnol., (1998) 49, pp. 72-76 was used. The culture was carried out using glycerol as carbon source. The DHA content of the initial mixture is 47.0% of the total fatty acids.

1.0 g of oil is dissolved in 40 ml of each of the following solvents: acetone, ethanol, isopropanol, n-hexane/ethanol (30:70; v:v) (approximately 2.5% by weight of oil, based on the solvent) and frozen for 17 h at −85° C. The mixtures are then centrifuged at 0° C. for 2 minutes at 3 600 g and the supernatant is taken off using a Pasteur pipette. After removing the solvents, clear yellow oils are obtained. In addition, a turbid yellow oil is produced as residue. The results of the analyses of the supernatants are reproduced in table 2. It can clearly be seen that the solvent used has a great influence on the experimental result. In this case, to produce a 60% strength DHA oil, preferably a solvent mixture ethanol:n-hexane (70:30, v/v) is suitable, and to produce a 68% strength DHA oil, pure ethanol is suitable as solvent.

TABLE 2

Results of the supernatant analyses of the winterization procedures using various solvents

|  | Starting oil | 2.5% oil in acetone | 2.5% oil in isopropanol | 2.5% oil in ethanol | 2.5% oil in ethanol/hexane (70:30, v:v) |
|---|---|---|---|---|---|
| DHA area % | 47.0% | 63.8% | 61.7% | 68.8% | 59.9% |
| DHA yield [%] | 100.0% | 67.4% | 11.5% | 17.2% | 78.8% |

The invention claimed is:

1. A method for producing concentrated polyunsaturated fatty acid-triglyceride mixtures, the method comprising the steps of:
   i) dissolving a natural polyunsaturated fatty acid oil in an organic solvent or an organic solvent mixture to form a solution, wherein between 1% to 10% by weight of the solution is natural polyunsaturated fatty acid oil based on the weight of the solvent or solvent mixture, and wherein the natural polyunsaturated fatty acid oil has a triglyceride content of greater than 85% by weight based on the total weight of the natural polyunsaturated fatty acid oil and a total polyunsaturated fatty acid content of greater than 39% by weight of total fatty acids;
   ii) winterizing the solution by allowing the solution to stand at a temperature in the range of between −35° C. to −100° C. for between five minutes to eighteen hours to form a heterogenous mixture;
   iii) separating the heterogenous mixture into a supernatant and a sediment phase, wherein the supernatant includes a concentrated polyunsaturated fatty acid-triglyceride mixture; and
   (iv) removing the organic solvent from the supernatant, thereby producing a concentrated polyunsaturated fatty acid-triglyceride mixture.

2. The method of claim 1, wherein the polyunsaturated fatty acid oil has a triglyceride content of greater than 90% by weight based on the total weight of the natural polyunsaturated fatty acid oil, and wherein between 2% to 5% by weight of the solution is natural polyunsaturated fatty acid oil based on the weight of the solvent or solvent mixture.

3. The method of claim 2, wherein the polyunsaturated fatty acid oil has a triglyceride content of greater than 95% by weight based on the total weight of the natural polyunsaturated fatty acid oil, and wherein between 2.1% to 3% by weight of the solution is natural polyunsaturated fatty acid oil based on the weight of the solvent or solvent mixture.

4. The method of claim 1, wherein the solution is allowed to stand between 5 to 120 minutes.

5. The method of claim 4, wherein the solution is allowed to stand between 30 to 60 minutes.

6. The method of claim 1, wherein the solution is allowed to stand at a temperature in the range of from −50° C. to −100° C.

7. The method of claim 6, wherein the solution is allowed to stand at a temperature in the range of from −85° C. to −100° C.

8. The method of claim 1, wherein the step of separating the heterogenous mixture includes centrifugation.

9. The method of claim 8, wherein the centrifugation is conducted at more than 1,000 g for a time of between 2 to 60 minutes.

10. The method of claim 1, wherein the step of separating the heterogenous mixture includes filtration.

11. The method of claim 10, wherein the filtration is conducted on dry ice at a temperature less than −60° C.

12. The method of claim 1, wherein the solvent or solvent mixture is selected from the group consisting of ethanol, n-hexane, acetone, isopropanol, methanol, or a mixture thereof.

13. The method of claim 12, wherein the natural polyunsaturated fatty acid oil is dissolved in a solvent mixture consisting of:
   a) n-hexane and ethanol, and wherein the amount of n-hexane in the solvent mixture is in a range of from 20% to 30% of the total volume of solvent mixture;
   b) n-hexane and acetone, and wherein the amount of n-hexane in the solvent mixture is in a range of from 5% to 20% of the total volume of solvent mixture; or
   c) n-hexane and ethanol, and wherein the amount of n-hexane in the solvent mixture is in a range of from 5% to 20% of the total volume of solvent mixture.

14. The method of claim 1, wherein the natural polyunsaturated fatty acid oil is a mixture selected from the group consisting of natural polyunsaturated fatty acid oils from microorganisms, fish oils, and vegetable oils.

\* \* \* \* \*

UNITED STATES PATENT AND TRADEMARK OFFICE
CERTIFICATE OF CORRECTION

PATENT NO.        : 7,588,791 B2
APPLICATION NO.   : 10/493116
DATED             : September 15, 2009
INVENTOR(S)       : Dirk Fabritius Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 921 days.

Signed and Sealed this

Twenty-first Day of September, 2010

David J. Kappos
*Director of the United States Patent and Trademark Office*